US009356293B2

(12) United States Patent
Yamamoto et al.

(10) Patent No.: US 9,356,293 B2
(45) Date of Patent: May 31, 2016

(54) COMPOSITE CARBON FIBERS

(71) Applicant: SHOWA DENKO K.K., Minato-ku, Tokyo (JP)

(72) Inventors: Ryuji Yamamoto, Minato-ku (JP); Takeshi Nakamura, Minato-ku (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 13/934,429

(22) Filed: Jul. 3, 2013

(65) Prior Publication Data

US 2014/0011092 A1   Jan. 9, 2014

Related U.S. Application Data

(60) Provisional application No. 61/672,681, filed on Jul. 17, 2012.

(30) Foreign Application Priority Data

Jul. 3, 2012   (JP) ................. 2012-150032

(51) Int. Cl.
*H01M 4/13*   (2010.01)
*H01M 4/62*   (2006.01)
*H01B 1/04*   (2006.01)
(Continued)

(52) U.S. Cl.
CPC .............. *H01M 4/625* (2013.01); *B82Y 30/00* (2013.01); *B82Y 40/00* (2013.01); *C01B 31/0226* (2013.01); *D01F 9/127* (2013.01); *H01B 1/04* (2013.01); *C01B 2202/36* (2013.01); *Y02E 60/122* (2013.01); *Y10T 428/2918* (2015.01)

(58) Field of Classification Search
CPC .......... H01M 2/00; H01M 4/00; H01M 10/00

USPC .................. 429/209, 212, 231.8, 231.95, 249
See application file for complete search history.

(56) References Cited

U.S. PATENT DOCUMENTS

2004/0072683 A1\*   4/2004   Kodas et al. .................. 502/224
2009/0087372 A1\*   4/2009   Buchholz et al. .......... 423/447.2
(Continued)

FOREIGN PATENT DOCUMENTS

WO   2006/137893 A2   12/2006
WO   2010/113884 A1   10/2010
(Continued)

OTHER PUBLICATIONS

European Search Report dated Jan. 15, 2014, issued by the European Patent Office in corresponding EP Application No. 13174771.

*Primary Examiner* — Patrick Ryan
*Assistant Examiner* — Ben Lewis
(74) *Attorney, Agent, or Firm* — Sughrue Mion, PLLC

(57) ABSTRACT

An object of the present invention is to provide composite carbon fibers in which multiwalled carbon nanotubes are homogeneously dispersed between graphitized carbon nanofibers and near the surface of the graphitized carbon nanofibers, the composite carbon fibers being capable of easily being dispersed in a matrix such as resin without leaving aggregates, and also imparting low resistance. Disclosed are composite carbon fibers comprising multiwalled carbon nanotubes having a fiber diameter of 5 nm or more and 30 nm or less and graphitized carbon nanofibers having a fiber diameter of 50 nm or more and 300 nm or less, wherein the multiwalled carbon nanotubes are homogeneously dispersed between the graphitized carbon nanofibers and near the surface of the graphitized carbon nanofibers.

11 Claims, 9 Drawing Sheets

(51) Int. Cl.
*C01B 31/02* (2006.01)
*D01F 9/127* (2006.01)
*B82Y 30/00* (2011.01)
*B82Y 40/00* (2011.01)

(56) References Cited

U.S. PATENT DOCUMENTS

2010/0189628 A1 7/2010 Schimpf
2011/0143139 A1* 6/2011 Maddan ........................ 428/402
2011/0163274 A1* 7/2011 Plee et al. ..................... 252/503
2011/0204296 A1 8/2011 Conzen et al.
2012/0171566 A1 7/2012 Yoshitake et al.
2012/0214070 A1 8/2012 Yamamoto et al.

FOREIGN PATENT DOCUMENTS

WO 2011/002222 A2 1/2011
WO 2013/049939 A1 4/2013

* cited by examiner

COMPOSITE CARBON FIBERS

This application claims priority under 35 U.S.C. sect. 119 (e) on U.S. Provisional Application No. 61/672,681 filed on Jul. 17, 2012 and under 35 U.S.C. sect. 119(a) on Patent Application No. 2012-150032 filed in Japan on Jul. 3, 2012, the entire contents of which are hereby incorporated by references.

TECHNICAL FIELD

The present invention relates to composite carbon fibers. More particularly, the present invention relates to composite carbon fibers in which multiwalled carbon nanotubes are homogeneously dispersed between graphitized carbon nanofibers and near the surface of the graphitized carbon nanofibers, the composite carbon fibers being excellent in the effect of easily being dispersed in a matrix such as a resin without leaving aggregates, and also imparting low electric resistance.

BACKGROUND ART

The method for producing multiwalled carbon nanotubes include chemical vapor deposition methods in which hydrocarbon and the like is thermally decomposed on catalyst metal to form multiwalled carbon nanotubes, and physical vapor deposition methods in which graphite is allowed to undergo sublimation by arc or laser to form multiwalled carbon nanotubes by the cooling process. The chemical vapor deposition methods are a method suited for large-scale synthesis since it is comparatively easy to scale-up a reactor.

The chemical vapor deposition methods can be roughly classified into two methods. One is a method in which a solution, prepared by dissolving metal compounds serving as a catalyst or a co-catalyst such as sulfur in a hydrocarbon such as benzene, is supplied to reaction field heated at 1,000° C. or higher using hydrogen as carrier gas, and formation of catalysts and growth of multiwalled carbon nanotubes are performed in the field (floating catalyst method). The other one is a method in which a supported catalyst in which catalyst metals or precursors are supported on carrier prepared in advance is placed in the reaction field heated at 500 to 700° C., and mixed gas of hydrocarbon such as ethylene with hydrogen or nitrogen is supplied and then reacted (supported catalyst method).

Since the reaction is performed in high temperature range of 1,000° C. or higher in the floating catalyst method, not only decomposition of the hydrocarbon on the catalyst metals but also an autolysis reaction of hydrocarbon proceeds. Pyrolytic carbon is deposited on the multiwalled carbon nanotube grown from the catalyst metal as the starting point, and the nanotube also grows in the thickness direction of the fiber. The multiwalled carbon nanotube obtained by this method (hereinafter, multiwalled carbon nanotubes having a fiber diameter of 50 nm or more synthesized by floating catalyst method is referred to as a carbon nanofiber) has comparatively low conductivity since it is coated with pyrolytic carbon having low crystallinity. Therefore, the multiwalled carbon nanotubes are synthesized by the floating catalyst method, and then graphitized by heat treatment in an inert gas atmosphere at a temperature of 2,600° C. or higher. The heat treatment enables proceeding of crystal rearrangement and graphite crystal growth, leading to an improvement in conductivity of the fiber. The heat treatment also enables vaporization of the catalyst metal to give carbon nanofibers with less impurity.

On the other hand, since the reaction is performed at 500 to 800° C. in the supported catalyst method, the autolysis reaction of the hydrocarbon is suppressed. It is possible to obtain thin multiwalled carbon nanotubes as a result of growing from the catalyst metals as the starting point. The obtained multiwalled carbon nanotubes have comparatively high crystallinity and comparatively high conductivity. Therefore, it is not necessary to perform the heat treatment for crystallization which is applied to the multiwalled carbon nanotubes obtained by the floating catalyst method. Since the multiwalled carbon nanotubes synthesized by the supported catalyst method is not subjected to the heat treatment at high temperature for crystallization, the catalyst metals remains in a percentage order in the multiwalled carbon nanotubes.

PRIOR ART LIST

Patent Literatures

Patent Document 1: JP 4835881 B

SUMMARY OF THE INVENTION

Problems to be Resolved by the Invention

The carbon nanofibers have such a comparatively large fiber diameter as 50 nm to 300 nm and has a fiber length of about 10 μm (FIG. 1). Because of weak entanglement between these carbon nanofibers, it is easy to disperse each fibrous carbon by adding to a matrix, followed by kneading. However, it may be difficult to sufficiently construct a conductive network by connecting fibrous carbons to each other.

On the other hand, the multiwalled carbon nanotubes synthesized by the supported catalyst method have such a small fiber diameter as 5 nm to 30 nm and also have a fiber length of 3 μm to 10 μm, thus it has an aspect ratio of about 1,000 (FIG. 2). These multiwalled carbon nanotubes are entangled with each other to form a several hundred microns thick aggregate (FIG. 3). Even if a fibrous carbon having such firmly entangled aggregation structure is added to a matrix, followed by kneading, the aggregate merely becomes thinner and the aggregation structure is maintained. Therefore, it is difficult to make a state where each fibrous carbon is dispersed. As a result, conductivity-imparting effect as expected may not be exerted.

Patent Document 1 discloses an electrode for a lithium ion battery, including a fibrous carbon having a diameter of less than 100 nm, and a fibrous carbon and/or a non-fibrous conductive carbon each having a diameter of 100 nm or more, as conductive materials. As mentioned below, it has been found that it is impossible to exert a remarkable effect in powder properties and battery characteristics even in the case of mixing a fibrous carbon having a diameter of 100 nm or more and low crystallinity with a fibrous carbon having a diameter of less than 100 nm.

An object of the present invention is to provide composite carbon fibers in which multiwalled carbon nanotubes are homogeneously dispersed between graphitized carbon nanofibers and near the surface of the graphitized carbon nanofibers, the composite carbon fibers being excellent in the effect of easily being dispersed in a matrix such as a resin without leaving aggregates, and also imparting low resistance.

Means for Solving the Problems

That is, the present invention includes the following aspects.

[1] Composite carbon fibers comprising multiwalled carbon nanotubes having a fiber diameter of 5 nm or more and 30 nm or less and graphitized carbon nanofibers having a fiber diameter of 50 nm or more and 300 nm or less, wherein the multiwalled carbon nanotubes are homogeneously dispersed between the graphitized carbon nanofibers and near the surface of the graphitized carbon nanofibers.

[2] The composite carbon fibers according to [1], in which compressed specific resistance at the compressed density of 0.8 g/cm$^3$ is lower than compressed specific resistance at the compressed density of 0.8 g/cm$^3$ measured using the multiwalled carbon nanotube alone, and is also lower than compressed specific resistance at the compressed density of 0.8 g/cm$^3$ measured using the graphitized carbon nanofiber alone.

[3] The composite carbon fibers according to [1] or [2], in which the multiwalled carbon nanotubes have $C_0$ value of 0.680 nm or more and 0.690 nm or less, and the graphitized carbon nanofibers have $C_0$ value of 0.676 nm or more and 0.680 nm or less.

[4] The composite carbon fibers according to any one of [1] to [3], in which the multiwalled carbon nanotubes have an oxidation initiation temperature of 400° C. or higher and 550° C. or lower, and the graphitized carbon nanofibers have an oxidation initiation temperature of 600° C. or higher and 700° C. or lower.

[5] The composite carbon fibers according to any one of [1] to [4], in which the amount of the multiwalled carbon nanotubes is 1% by mass or more and 50% by mass or less in the composite carbon fibers.

[6] The composite carbon fibers according to any one of [1] to [5], which do not substantially contain multiwalled carbon nanotube aggregates having an aggregate size of 1 μm or more.

[7] The composite carbon fibers according to any one of [1] to [6], in which a ratio ($\rho/\rho_0$) of a density $\rho$ of composite carbon fibers when compressed under a load of 1,000 N or more to a density $\rho_0$ of graphitized carbon nanofibers when compressed under the same load is 0.95 or more.

[8] Aggregates comprising the composite carbon fibers according to any one of [1] to [7].

[9] The aggregates according to [8], in which 50% particle diameter ($D_{50}$) in volume-based cumulative particle size distribution by laser diffraction particle size analysis is 5 μm or more and 20 μm or less.

[10] An electrode for a battery, comprising the composite carbon fibers or composite carbon fiber aggregates according to any one of [1] to [9].

Advantageous Effects of the Invention

With regard to the composite carbon fibers according to an embodiment of the present invention, when electrodes of a lithium secondary battery are allowed to contain, as a conductivity-imparting agent, the composite carbon fibers having excellent effect of easily being dispersed in a matrix such as a resin without leaving aggregates, and also imparting low electric resistance, battery characteristics such as a capacity retention ratio are improved.

EMBODIMENTS FOR CARRYING OUT THE INVENTION

Figure 1:
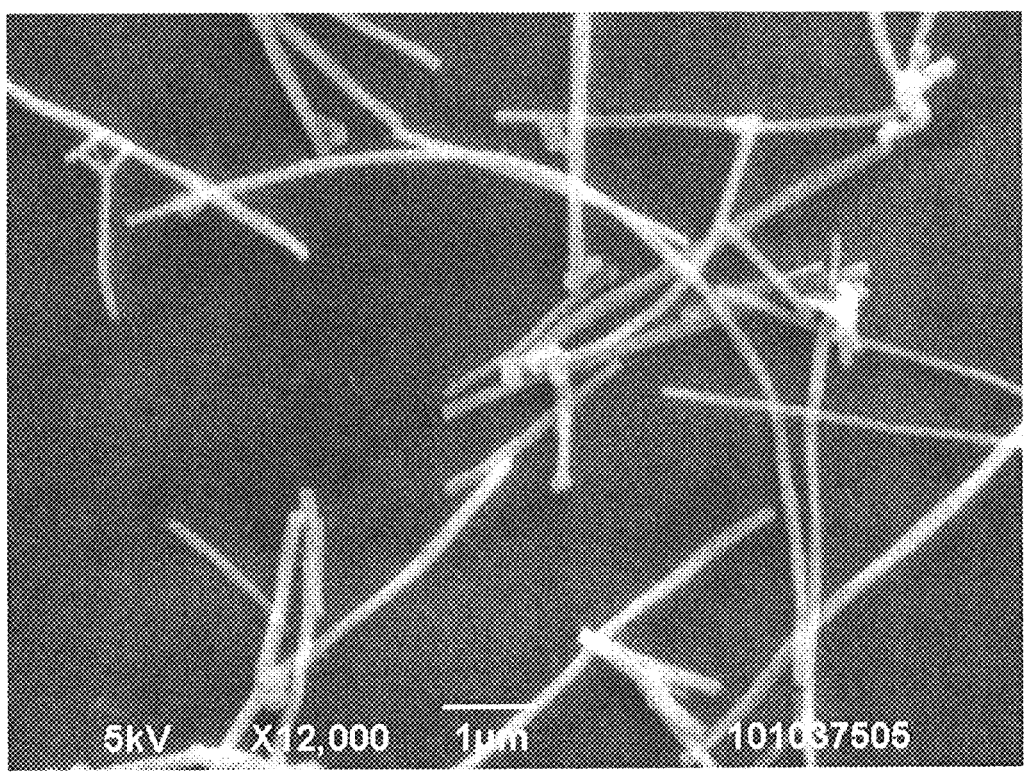
FIG. 1 a diagram showing an example of a scanning electron micrograph of graphitized carbon nanofibers (12 k times).

The composite carbon fibers according to an embodiment of the present invention comprises multiwalled carbon nanotubes having a fiber diameter of 5 nm or more and 30 nm or less, and graphitized carbon nanofibers having a fiber diameter of 50 nm or more and 300 nm or less. As used herein, "fiber diameter of 5 nm or more and 30 nm or less" means that 99 number % or more of fibers have a fiber diameter within a range of 5 nm or more and 30 nm or less, while "fiber diameter of 50 nm or more and 300 nm or less" means that 99 number % or more of fibers have a fiber diameter within a range of 50 nm or more and 300 nm or less.

In the present invention, the amount of the multiwalled carbon nanotubes having a fiber diameter of 5 nm or more and 30 nm or less is 1 part by mass or more and 100 parts by mass or less, preferably 5 parts by mass or more and 90 parts by mass or less, and more preferably 10 parts by mass or more and 80 parts by mass or less, based on 100 parts by mass of the graphitized carbon nanofibers having a fiber diameter of 50 nm or more and 300 nm or less.

In the composite carbon fibers according to an embodiment of the present invention, it is preferred that compressed specific resistance at the compressed density of 0.8 g/cm$^3$ is lower than a compressed specific resistance at the compressed density of 0.8 g/cm$^3$ measured using the multiwalled carbon nanotubes alone, and is also lower than a compressed specific resistance at the compressed density of 0.8 g/cm$^3$ measured using the graphitized carbon nanofibers alone. The reason why compressed specific resistance meets such relation in the composite carbon fibers according to a preferred embodiment of the present invention is considered because the multiwalled carbon nanotubes and the graphitized carbon nanofibers are moderately entangled with each other, and uniformly dispersed without forming a large aggregates, and thus forming a dense conductive network.

There is no particular limitation by the synthesis method on the multiwalled carbon nanotubes used in the present invention, and the multiwalled carbon nanotubes are preferably multiwalled carbon nanotubes synthesized by vapor phase method, and more preferably multiwalled carbon nanotubes synthesized by a supported catalyst method.

The supported catalyst method is a method in which carbon fibers are produced by reacting carbon source in vapor phase, using catalysts comprising catalyst metals supported on inorganic carrier.

Examples of the inorganic carrier include alumina, magnesia, silica-titania, calcium carbonate and the like. The inorganic carrier is preferably in a particulate form. Examples of the catalyst metal include iron, cobalt, nickel, molybdenum, vanadium and the like. Supporting can be carried out by impregnating a carrier with a solution of compounds containing a catalyst metal element, or by coprecipitating a solution of compounds containing a catalyst metal element and compounds containing elements composing an inorganic carrier, or by other known supporting methods.

Examples of the carbon source include methane, ethylene, acetylene and the like. The reaction can be carried out in a reaction vessel such as a fluidized bed, a moving bed or a fixed bed. The temperature in a reaction vessel is preferably set in a range from 500° C. to 800° C. To supply the carbon source to the reaction vessel, a carrier gas can be used. Examples of the carrier gas include hydrogen, nitrogen, argon and the like. The reaction time is preferably from 5 to 120 minutes.

The multiwalled carbon nanotubes comprises a tubular structure in which a graphene sheet made of a six-membered carbon ring is wound in parallel to a fiber axis; a platelet structure in which a graphene sheet is arranged perpendicularly to a fiber axis; and a herringbone structure in which a graphene sheet is wound at a slanting angle to a fiber axis. Of these structures, the tubular structure is preferred in view of conductivity and mechanical strength.

The fiber diameter of the multiwalled carbon nanotubes is usually 5 nm or more and 30 nm or less, preferably 7 nm or more and 20 nm or less, and more preferably 9 nm or more and 15 nm or less. The fiber diameter of less than 5 nm may cause difficulty in disenentangling and dispersing each fiber. The fiber having a fiber diameter of more than 30 nm may cause difficulty in producing it by the supported catalyst method.

An aspect ratio of the multiwalled carbon nanotube is preferably 100 or more and 1,000 or less. Small aspect ratio may decrease the degree of entanglement between fibers and thus cause difficulty in forming an efficient conductive network. Large aspect ratio may increase the degree of entanglement between fibers and thus cause difficulty in dispersing the fiber.

A BET specific surface area of the multiwalled carbon nanotubes are preferably 200 m$^2$/g or more and 300 m$^2$/g or less, more preferably 240 m$^2$/g or more and 280 m$^2$/g or less, and still more preferably 250 m$^2$/g or more and 270 m$^2$/g; or less.

A $C_0$ value of the multiwalled carbon nanotubes are preferably 0.680 nm or more and 0.690 nm or less. The carbon nanotubes having a $C_0$ value of less than 0.680 nm may cause difficulty in disentangling an aggregate because the fiber loses flexibility.

An oxidation initiation temperature of the multiwalled carbon nanotubes are preferably 400° C. or higher and 550° C. or lower. The oxidation initiation temperature is defined as a temperature at which the weight decreases by 0.1% relative to initial weight (charge amount) when the temperature is raised to 1,000° C. at 10° C./minute under air flow in thermobalance. As the oxidation initiation temperature becomes lower, defects in the carbon crystal may increase.

Compressed specific resistance at the compressed density 0.8 g/cm$^3$ of multiwalled carbon nanotubes is preferably 0.014 Ωcm or more and 0.020 Ωcm or less. The multiwalled carbon nanotubes having small compressed specific resistance may cause losing of flexibility of the fiber. Large compressed specific resistance may cause exertion of low conductivity-imparting effect.

The graphitized carbon nanofibers used in the present invention are not particularly limited by the synthesis method and are preferably synthesized by vapor phase method, and more preferably graphitized carbon nanofibers obtained by synthesizing floating catalyst method, followed by heat treatment in an inert atmosphere at 2,000° C. or higher.

The floating catalyst method is a method in which a raw material solution prepared by dissolving ferrocene as catalyst source and sulfur compound in benzene as carbon source, or gasses prepared by gasification of the raw material liquid are introduced into a flow reaction furnace heated at 1,000° C. or higher using carrier gas such as hydrogen to obtain carbon nanofibers. Commonly, a hollow tube is formed from a catalyst metal as the starting point at an initial stage of a reaction and an approximate length of the carbon nanofibers is decided. Thereafter, pyrolytic carbon is accumulated on the surface of the hollow tube and growth in the diameter direction proceeds to form a growth ring-shaped carbon structure. Therefore, it is possible to adjust the fiber diameter by the amount of pyrolytic carbon accumulated on the carbon nanofiber during the reaction, that is, the reaction time, the concentration of the raw material in the atmosphere, and the reaction temperature. The carbon nanofibers obtained by this reaction may have low conductivity since it is coated with pyrolytic carbon having low crystallinity. Thus, in order to enhance crystallinity of the carbon nanofibers, heat treatment is carried out in the atmosphere of an inert gas such as argon at 800 to 1,500° C., followed by graphitization treatment at 2,000 to 3,000° C. The graphitization treatment enables removal of the catalyst metal through vaporization simultaneously, leading to high purity of the carbon nanofibers.

With regard to the graphitized carbon nanofibers obtained by the heat treatment, it is possible to adjust the length of the fiber or to break a branch of a branched carbon nanofibers by a pulverizer. The graphitized carbon nanofibers whose branches were broken by the pulverizing can be easily compressed and dispersed because of lowered interference between fibers.

The fiber diameter of the graphitized carbon nanofibers is usually 50 nm or more and 300 nm or less, preferably 75 nm or more and 250 nm or less, and more preferably 100 nm or more and 200 nm or less. Large fiber diameter may cause a decrease in aspect ratio of the fiber because of the fiber growth mechanism. The aspect ratio decreases due to a large fiber diameter may cause a decrease in number of fibers per unit weight, leading to difficulty in efficiently forming a network in the matrix such as a resin. On the other hand, the aspect ratio increases due to a small fiber diameter may cause aggregation with ease, leading to difficulty in dispersing in the matrix such as a resin.

A BET specific surface area of the graphitized carbon nanofibers is preferably 6 m$^2$/g or more and 40 m$^2$/g or less, more preferably 8 m$^2$/g or more and 25 m$^2$/g or less, and still more preferably 10 m$^2$/g or more and 20 m$^2$/g or less.

A $C_0$ value of the graphitized carbon nanofibers is preferably 0.676 nm or more and 0.680 nm or less. The graphitized carbon nanofibers having a $C_0$ value of more than 0.680 nm may cause deterioration of conductivity.

An oxidation initiation temperature of the graphitized carbon nanofibers is preferably 600° C. or higher and 700° C. or lower. The graphite crystal may fail to sufficiently grow at the oxidation initiation temperature of lower than 600° C.

Compressed specific resistance at the compressed density of 0.8 g/cm$^3$ of the graphitized carbon nanofibers is preferably 0.006 Ωcm or more and 0.017 Ωcm or less. It is difficult to adjust compressed specific resistance of the graphitized carbon nanofibers to less than 0.006 Ωcm. On the other hand, compressed specific resistance of more than 0.017 Ωcm may exert low conductivity-imparting effect.

Figure 8:
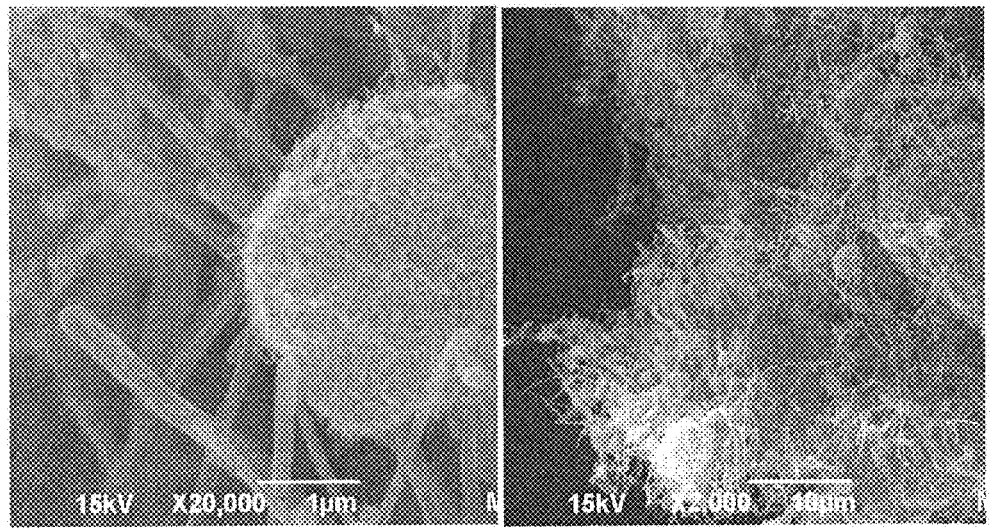
FIG. 8 a diagram showing an example of a scanning electron micrograph of a mixed carbon fiber aggregate (20 k times at the left, 2 k times at the right).

Commonly, since the carbon nanotubes are extremely likely to be aggregated, even if the carbon nanofibers are mixed with the carbon nanotubes, a carbon nanotube aggregates having an aggregate size of 1 μm or more and carbon nanofibers independently exist (see FIG. 8).

Figure 7:
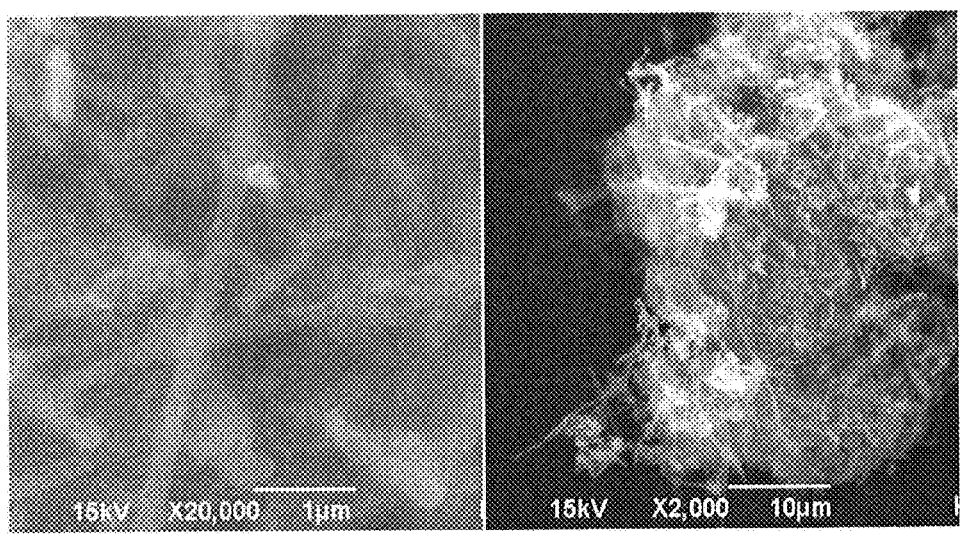
FIG. 7 a diagram showing an example of a scanning electron micrograph of a composite carbon fiber aggregate (20 k times at the left, 2 k times at the right).

In the composite carbon fibers according to an embodiment of the present invention, the multiwalled carbon nanotubes are homogeneously dispersed on the surface of the graphitized carbon nanofibers and between the graphitized carbon nanofibers. As shown in FIG. 7, this dispersion state is a state where carbon nanofibers extend through the space between carbon nanotubes disentangled in a loosen state, the carbon nanotubes in an entangled state being entangled with a surface of the carbon nanotubes.

The dispersion state in the composite carbon fibers according to an embodiment of the present invention is quite different from the state shown in FIG. 8, and is an extremely specific state.

The composite carbon fibers according to an embodiment of the present invention do not substantially contain carbon nanotube aggregates having an aggregate size of 1 μm or more. The phrase "does not substantially contain carbon nanotube aggregates having an aggregate size of 1 μm or more" means that visual field of the carbon nanotube aggregates having an aggregate size of 1 μm or more is one or less visual field when ten visual fields (area of one visual field: 70 μm×70 μm) of the composite carbon fibers are observed at random by a scanning electron microscope at a magnification of 2 k times.

The composite carbon fibers according to an embodiment of the present invention can be obtained, for example, by the following method. First, multiwalled carbon nanotubes and graphitized carbon nanofibers are added in pure water, followed by mixing to obtain slurry. The slurry is injected into a pulverizing nozzle of a high-pressure dispersion device using a pump to obtain a paste. The slurry passed through the nozzle at super-high speed thereby to form strong shear force due to turbulence, and the shear force enables disentanglement of a multiwalled carbon nanotube aggregates, leading to uniform mixing with the graphitized carbon nanofibers. The solid content (concentrations of the multiwalled carbon nanotubes and the graphitized carbon nanofibers) of the slurry is preferably 5% by mass or less. The solid content of more than 5% by mass may cause an increase in viscosity of the slurry, leading to difficulty in proceeding of efficient pulverizng of the multiwalled carbon nanotube aggregates. It is preferred that a dispersing agent is not used since the addition of the dispersing agent to the slurry may cause difficulty in removing it from the composite carbon fibers.

Examples of the high-pressure dispersion device include Nanovater manufactured by Yoshida Kikai Co., Ltd., Star Burst manufactured by SUGINO MACHINE LIMITED, NanoMaker available from Advanced Nano Technology Co., Ltd. and the like. The pressure for injection into a nozzle is preferably 100 MPa or more and 250 MPa or less. The number of the operation of injecting the liquid into a nozzle or passing the liquid therethrough is preferably five or less times. The number of the operation of more than five times may cause formation of shortening multiwalled carbon nanotubes and graphitized carbon nanofibers, and reaggregation.

Then, the obtained slurry can be powdered by drying. Examples of the drying method include spray drying, freeze-drying, drum drying, flush drying, hot-air drying and vacuum drying methods. The drying temperature is appropriately set by type of a dryer. Drying is preferably carried out until the moisture content as measured by a Karl-Fischer method becomes 0.5% by mass or less. After drying, pulverization is preferably carried out, if necessary. The pulverizing method is preferably a pulverizer using impact force by a hammer, a jet mill using collision of substances each other.

Size of the thus obtained composite carbon fiber aggregates is preferably 5 μm or more and 20 μm or less in terms of 50% particle diameter $D_{50}$ in volume-base particle size distribution measured by a particle size distribution analyzer using a laser diffraction and scattering method.

In the composite carbon fibers according to an embodiment of the present invention, a ratio ($\rho/\rho_0$) of a density $\rho$ of composite carbon fibers when compressed under a load of 1,000 N or more to a density $\rho_0$ of graphitized carbon nanofibers when compressed under the same load is preferably 0.95 or more. The graphitized carbon nanofibers per se have a small aspect ratio and exerts low interaction between fibers, and thus easily undergoes compressive deformation under load. On the other hand, the multiwalled carbon nanotubes have a high aspect ratio and thus forms micron-order aggregates. Since the aggregate rebounds like a rubber ball, the density does not reach the same density as that of the graphitized carbon nanofibers unless a large load is applied.

A load-compressed density curve of aggregate-free composite carbon fibers composed of multiwalled carbon nanotubes is nearly the same as a load-compressed density curve of graphitized carbon nanofibers alone. That is, a ratio ($\rho/\rho_0$) of a density $\rho$ of a composite carbon fibers when compressed under a load of 1,000 N or more to a density $\rho_0$ of a graphitized carbon nanofibers when compressed under the same load is 0.95 or more.

A load-compressed density curve of composite carbon fibers comprising a multiwalled carbon nanotube aggregates existing therein deviates from a load-compressed density curve of graphitized carbon nanofibers alone. That is, a ratio ($\rho/\rho_0$) of a density $\rho$ of composite carbon fibers when compressed under a load of 1,000 N or more to a density $\rho_0$ of graphitized carbon nanofibers when compressed under the same load is less than 0.95.

In case an existing ratio of the multiwalled carbon nanotubes in the powder is less than 5% by mass, it might be impossible to judge the presence or absence of aggregates only by this method. Therefore, it might be necessary to evaluate, together with scanning electron microscopic observation of the powder.

In the composite carbon fibers according to an embodiment of the present invention, compressed specific resistance at the compressed density 0.8 g/cm³ is preferably 0.005 Ωcm or more and 0.015 Ωcm or less. In the composite carbon fibers according to an embodiment of the present invention, it is preferred that compressed specific resistance at the compressed density of 0.8 g/cm³ is lower than a compressed specific resistance at the compressed density of 0.8 g/cm³ measured using the multiwalled carbon nanotubes alone, and is also lower than a compressed specific resistance at the compressed density of 0.8 g/cm³ measured using the graphitized carbon nanofibers alone.

The composite carbon fibers according to an embodiment of the present invention can be suited for use in the cathode and/or the anode of a battery since it functions as a conductivity-imparting agent. For example, the cathode of the battery is composed of a cathode active material, a conductivity-imparting agent and a binder. For example, the anode of the battery is composed of an anode active material, a conductivity-imparting agent and a binder.

It is possible that one, or two or more cathode active materials can be appropriately selected from among conventionally known materials (materials capable of intercalating/deintercalating lithium ions) known as a cathode active material in a lithium-based battery, and used as the cathode active material. Of these materials, a lithium-containing metal oxide capable of intercalating/deintercalating lithium ions is preferred. Examples of the lithium-containing metal oxide include complex oxides containing a lithium element, and at least one element selected from Co, Mg, Cr, Mn, Ni, Fe, Al, Mo, V, W and Ti.

It is possible that one, or two or more anode active materials can be appropriately selected from among conventionally known materials (materials capable of intercalating/deintercalating lithium ions) known as an anode active material in a lithium-based battery, and used as the anode active material. Examples of the material capable of intercalating/deintercalating lithium ions include carbon material, any one of Si and Sn, or an alloy or oxide containing at least one of them and the like. Of these materials, a carbon material is preferable. Typical examples of the carbon material include artificial graphites produced by heat treatment of natural graphite, and petroleum- and coal-based coke; hard carbon produced by carbonizing a resin, and mesophase pitch-based carbon material. In view of an increase in battery capacity, spacing $d_{002}$ to be calculated from (002) diffraction line by powder X-ray diffraction of natural graphite or artificial graphite is preferably from 0.335 to 0.337 nm. It is possible to use, as the anode active material, each of Si and Sn alone, an alloy containing at least one of Si and Sn, and oxides thereof, in addition to the carbon material.

It is possible to use, as the conductive additive, for example, carbon black-based conductive materials such as acetylene black, furnace black and Ketjen black in combination, in addition to the composite carbon fibers according to the present invention. It is also possible that the carbon black-based conductive material is dry-blended with the composite carbon fibers, and the obtained mixture is added in the preparation of electrode slurry. A mixing ratio of the composite carbon fibers to the carbon black-based conductive material is preferably from 10:90 to 70:30, and more preferably from 20:80 to 50:50. Dry blending may enable uniform mixing in a dry state using a nautamixer or a planetary mixer, and there is no particular limitation on the mixer or mixing conditions.

The binder can be appropriately selected from conventionally known materials and then used as the binder of the electrode for a lithium-based battery. Examples of the binder include fluorine-containing macromolecular polymers such as polyvinylidene fluoride, vinylidene fluoride-hexafluoropropylene copolymer, vinylidene fluoride-chlorotrifluoroethylene copolymer and vinylidene fluoride-tetrafluoroethylene copolymer, styrene-butadiene copolymer rubber (SBR) and the like.

EXAMPLES

The present invention will be more specifically described below for illustrative purposes only, and the present invention is not limited thereto.

Properties of multiwalled carbon nanotubes and carbon nanofibers were measured by the following procedure.
[Scanning Electron Microscopic Observation]

A sample powder was allowed to adhere to a carbon tape and subjected to vapor deposition of gold to give an observation sample, which was then observed by JSM-6390 manufactured by JEOL Ltd.
(Dispersion State)

Using a scanning electron microscope, ten visual fields were observed at a magnification of 20 k times. Then, a judgment was made whether or not carbon nanofibers extend through the space between carbon nanotubes disentangled in a loosen state, and the carbon nanotubes disentangled state being entangled in the vicinity of surfaces of the carbon nanofibers. The case where the above-mentioned dispersion state is observed in eight or more visual fields of ten visual fields was rated "Good" as shown in Table 2 since it is recognized that "multiwalled carbon nanotubes are homogeneously dispersed between the graphitized carbon nanofibers and on the surface of the graphitized carbon nanofibers". The case where the above-mentioned dispersion state is observed in less than two visual fields of ten visual fields was rated "Poor" as shown in Table 2 since it is recognized that "multiwalled carbon nanotubes are not homogeneously dispersed between the graphitized carbon nanofibers and on the surface of the graphitized carbon nanofibers". The case where the above-mentioned dispersion state is observed in two or more visual fields and less than seven visual fields of ten visual fields was rated "Generally Good" as shown in Table 2 since it is recognized that "multiwalled carbon nanotubes are homogeneously dispersed, generally, between graphitized carbon nanofibers and on the surface of the graphitized carbon nanofibers". One visual field measures 70 μm×70 μm.
(Presence or Absence of Carbon Nanotube Aggregate Having Aggregate Size of 1 μm or More)

Using a scanning electron microscope, ten visual fields were observed at a magnification of 2 k times. In the case where the number of visual fields including carbon nanotube aggregates having an aggregate size of 1 μm or more is 1 or less of ten visual fields, it was expressed by "Not observed" as shown in Table 2 since it is recognized that "carbon nanotube aggregates having an aggregate size of 1 μm or more is not substantially contained". In the case where the number of visual fields including carbon nanotube aggregates having an aggregate size of 1 μm or more is 2 or more of ten visual fields, it was expressed by "Observed" as shown in Table 2 since it is recognized that "carbon nanotube aggregates having an aggregate size of 1 μm or more is substantially contained". One visual field measures 70 μm×70 μm.

In case where a micron-order globular substance is recognized when observed at a magnification of 2 k times, the globular substance was observed again at a magnification of 10 k or more and it was reconfirmed whether or not it is an aggregate of the multiwalled carbon nanotubes.

(Fiber Diameter of Carbon Nanofibers)

Using a scanning electron microscope, diameters of 100 or more fibers were measured by a magnification of 20 k times and an average of the diameters was adopted as a fiber diameter.

(Fiber Length of Carbon Nanofibers)

Using a scanning electron microscope, photographs of the fiber were panoramatically taken at a magnification of 10 k or more times to prepare the visual field which enables the measurement of both ends of the fiber. The lengths of 100 or more fibers were measured and the average thereof was adopted as a fiber length.

[Transmission Electron Microscopic Observation]

After collecting a small amount of a sample powder in ethanol, the sample was dispersed by irradiation with ultrasonic wave. The sample was supported on a carbon microgrid (equipped with a supporting film). The sample was adopted as an observation sample and then observed by 9500 manufactured by Hitachi, Ltd.

(Fiber Diameter of Multiwalled Carbon Nanotubes)

Using a transmission electron microscope, diameters of 100 or more fibers were measured by a magnification of 100 k times and an average of the diameters was adopted as a fiber diameter.

(Fiber Length of Multiwalled Carbon Nanotubes)

Using a transmission electron microscope, photographs of the fiber were panoramatically taken at a magnification of 100 k or more times to prepare the visual field which enables the measurement of both ends of the fiber. The lengths of 50 or more fibers were measured and the average thereof was adopted as a fiber length.

(Compressed Specific Resistance, Load-Compressed Density Curve)

Figure 14:
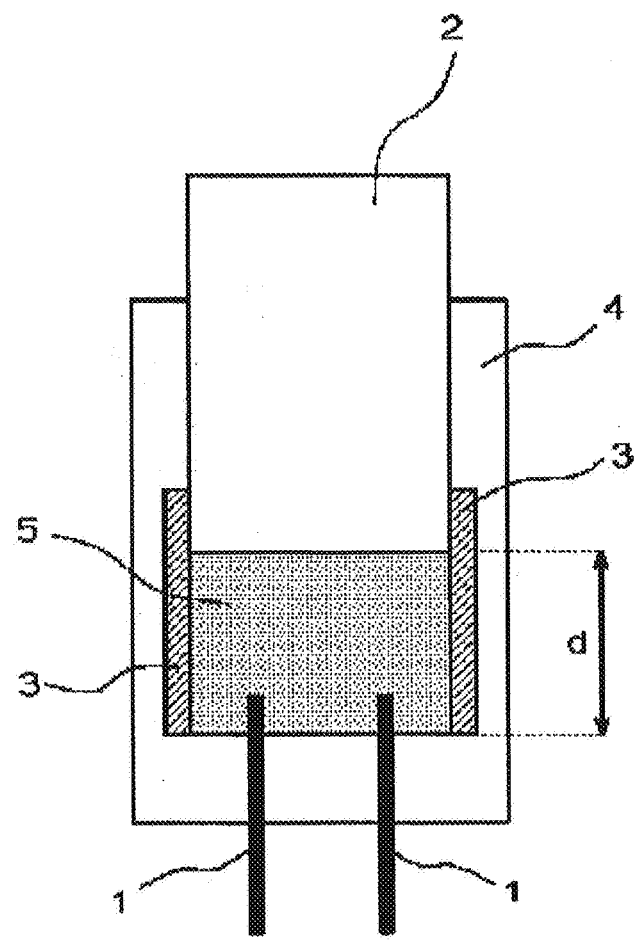
FIG. 14 a diagram showing a vertical section of a cell for measurement of powder resistivity.

A measurement jig shown in FIG. 14 was used. A cell 4 is made of a resin measuring a plane area of $(1 \times 4)$ cm$^2$ and a depth of 10 cm, and is provided with a current terminal 3 made of a copper plate for allowing a current to flow to the object to be measured 5, and a terminal 1 for measurement of a voltage in the middle. A given amount of a sample is placed in the cell 4 and the sample is compressed by applying a force to a compression rod 2 from the above. A current of 0.1 A was allowed to flow to the sample and, at the time of the bulk density of 0.8 g/cm$^3$, a voltage at a distance of 2.0 cm between two terminals 1 for measurement of a voltage inserted from the bottom of a vessel was read, and then resistivity R was calculated by the following equation:

$$R=(E/0.1) \times D/2$$

where R denotes a resistivity [Ωcm], D denotes a cross-sectional area in the current direction of a powder (depth×width)=10 d [cm$^2$], and E denotes a voltage across terminal [V].

The resistivity varies depending on the pressurized conditions and high resistivity is exhibited under low pressure, and the resistivity decreases as the pressure increases. The resistivity becomes nearly a given value under certain pressure or higher. In the present Example, resistivity when compressed to the bulk density of 0.8 g/cm$^3$ was adopted as a compressed specific resistance.

At the time of measurement of the compressed specific resistance, data of the compressed density ρ under the load of 2,000 N was read and a ratio ($\rho/\rho_0$) of the compressed density ρ to the compressed density $\rho_0$ under the same load of carbon nanofibers alone composing the carbon fiber was calculated.

(Specific Surface Area)

Using NOVA 1000 manufactured by Yuasa Ionics Co., Ltd., the amount of nitrogen gas adsorbed at liquid nitrogen temperature (77 K) was calculated by BET method.

(Measurement of $C_0$)

Using Multipurpose X-ray diffraction system (Ultima IV manufactured by Rigaku Corporation) for horizontal sample mounting, the measurement was carried out by using silicone powder as an internal standard in accordance with Gakushin-ho method ("Latest Experimental Technique for Carbon Materials (Analysis Part)", Edited by Carbon Society of Japan).

(Thermal Analysis)

In thermal analysis, EXSTAR6000 TG/DTA manufactured by SII NanoTechnology Inc. was used. A sample (10 mg) was placed on a platinum pan and then heated to 1,000° C. at a heating rate of 10° C./minute under thermal analysis measurement conditions of air flowing at a rate of 100 ml/minute.

(Concentration of Metal in Multiwalled Carbon Nanotubes and Carbon Nanofibers)

After collecting 20 to 40 mg of a sample in a beaker made of Teflon, 2 ml of sulfuric acid was added and a watch glass made of Teflon was put on the beaker, and then the beaker was placed on a ceramic heater 300° C., followed by heating for 30 minutes and allowing to cool for about 5 minutes. Then, 0.5 ml of nitric acid was added thereto, followed by heating. Until it became impossible to visually observe the contents, the addition of the nitric acid was repeated. After cooling to room temperature, about 20 ml of pure water and 0.5 ml of 50% hydrofluoric acid was added, followed by heating at 60 to 70° C. on a hot plate for 2 hours. Contents of the beaker were transferred to a vessel made of polypropylene and made to a constant volume of 50 ml, and then iron and molybdenum were quantitatively determined by ICP emission spectrometer (Vista-PRO manufactured by SII NanoTechnology Inc.).

(Measurement of Particle Size)

After weighing, 0.007 g of a sample was charged in a beaker containing 20 ml of pure water, and 0.2 g of Triton diluted solution (diluted 100 times with pure water) was added dropwise. The beaker was treated by an ultrasonic disperser for 5 minutes. Then, 30 ml of pure water was added to the beaker, followed by treatment for 3 minutes using an ultrasonic disperser. The particle size of the dispersion was measured by Microtrac HRA manufactured by Nikkiso Co., Ltd.

(Measurement of Moisture)

A sample was placed in a heating furnace at 200° C., through which nitrogen gas flows, and flowing nitrogen gas was introduced into a measurement cell of Karl Fischer Moisture Analyzer (AQ-2200F manufactured by Hiranuma Sangyo Corporation), and then the moisture was measured. The integrated value up to a titration end-point was adopted as the moisture content.

(Multiwalled Carbon Nanotubes)

Production Example 1

Preparation of Catalyst

Aluminum hydroxide (HIGILITE (registered trademark) M-43 manufactured by Showa Denko K.K.) was subjected to heat treatment in the atmosphere where air flows at 850° C. for 2 hours to prepare a carrier.

In a 300 ml tall beaker, 50 g of pure water was charged, and then 4.0 g of the carrier was added and dispersed to prepare carrier slurry.

In a 50 ml beaker, 16.6 g of pure water was charged, and then 0.32 g of hexammonium heptamolybdate tetrahydrate (manufactured by Junsei Chemical Co., Ltd.) was added and dispersed. Thereafter, 7.23 g of iron(III) nitrate nonahydrate (manufactured by Kanto Chemical Co., Inc.) was added and dispersed to prepare a catalyst solution.

In another 50 ml beaker, 32.7 g of pure water was charged, and then 8.2 g of ammonium carbonate (manufactured by Kanto Chemical Co., Inc.) was added and dispersed to prepare a pH control liquid.

A stirring bar was placed in a tall beaker containing carrier slurry, and then the beaker was placed on a magnetic stirrer, followed by stirring. While monitoring using a pH meter so as to maintain the pH of the slurry at 6.0±0.1, the catalyst solution and the pH control liquid were respectively added dropwise in the carrier slurry using a Pasteur pipette. Fifteen minutes were required to add the total amount of the catalyst solution to the carrier slurry. Contents of tall beaker were separated by a filter paper (5 C) and the cake on the filter paper was washed by spraying 50 g of pure water. The thus washed filter cake was transferred to a porcelain dish and then dried for 6 hours by a hot-air dryer at 120° C. The obtained dry matter was pulverized by a mortar to obtain a catalyst for synthesis of multiwalled carbon nanotubes.

Production Example 2

Synthesis of Multiwalled Carbon Nanotube: MWCNT

The catalyst (1.0 g) obtained in Production Example 1 was placed on a quartz boat. The quartz boat was placed at the center in a horizontal tubular furnace (quartz tube: inner diameter of 50 mm, length of 1,500 mm, soaking area of 600 mm). While allowing nitrogen gas to flow through the horizontal tubular furnace at 500 ml/minute, a temperature was raised to 680° C. over 30 minutes. Thereafter, supply of the nitrogen gas was stopped and mixed gasses of ethylene with hydrogen (ethylene concentration of 50% by volume) were allowed to flow at 2,000 ml/minute, followed by reaction for 20 minutes to synthesize multiwalled carbon nanotubes. Supply of the mixed gasses were stopped and the nitrogen gas was supplied. After cooling to room temperature, the multiwalled carbon nanotubes were taken out from the furnace.

Figure 2:
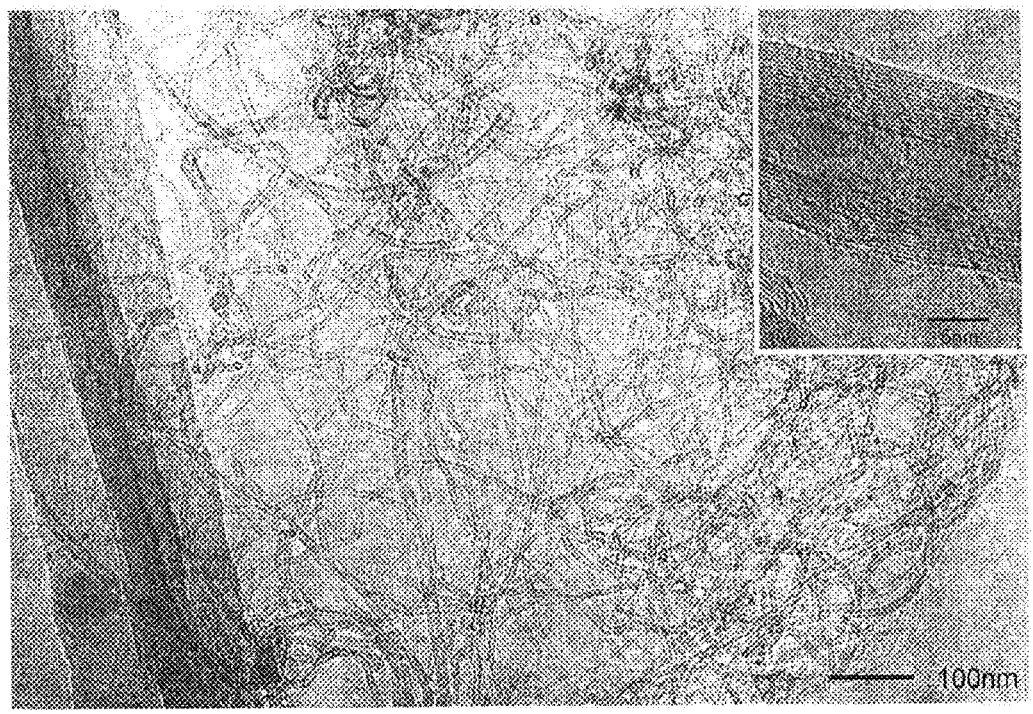
FIG. 2 a diagram showing an example of a transmission electron micrograph of multiwalled carbon nanotubes (100 k times at the center of the micrograph, 500 k times at the upper right).
Figure 3:
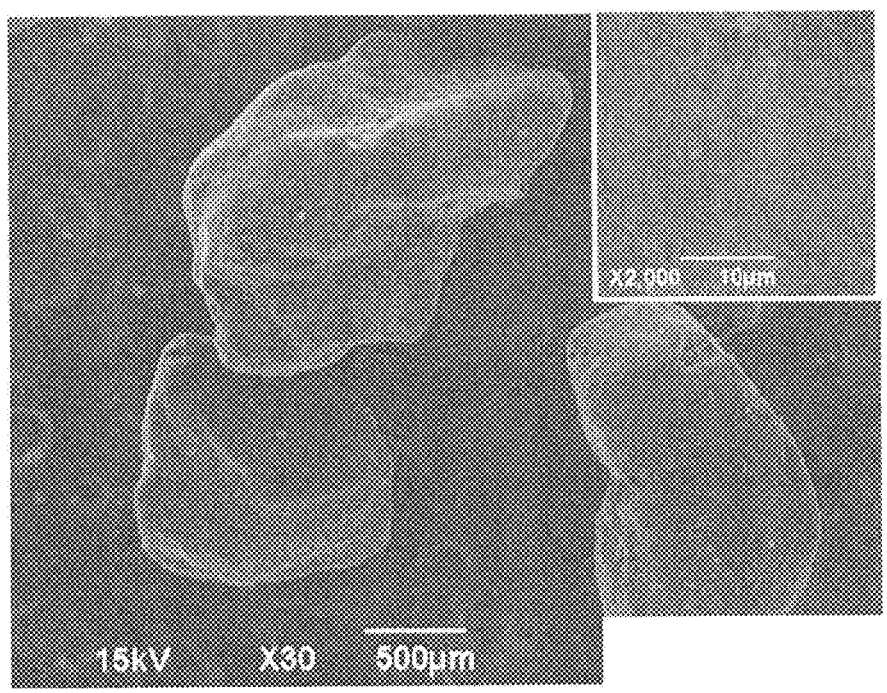
FIG. 3 a diagram showing an example of a scanning electron micrograph of multiwalled carbon nanotube aggregates immediately after synthesis (30 times at the center of the micrograph, 2 k times at the upper right).
Figure 5:
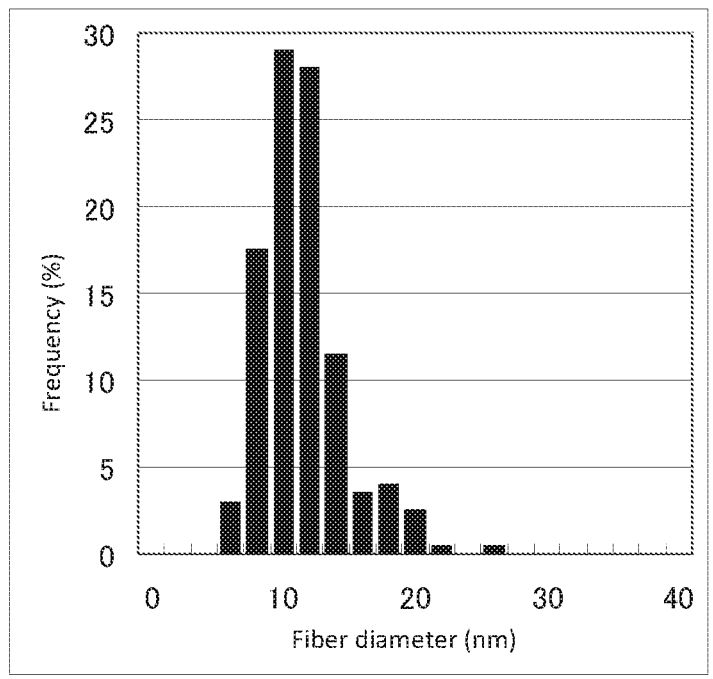
FIG. 5 a diagram showing fiber diameter distribution of multiwalled carbon nanotubes.

Fiber shape and powder properties are shown in Table 1. A transmission electron micrograph is shown in FIG. 2, a scanning electron micrograph of aggregates is shown in FIG. 3, and fiber diameter distribution is shown in FIG. 5.

Production Example 3

Pulverizng of Multiwalled Carbon Nanotube: Pulverized MWCNT Product

Using a jet mill STJ-200 manufactured by Seishin Enterprise Co., Ltd., the multiwalled carbon nanotubes synthesized in Production Example 2 were supplied at 6 kg/h and pulverized under the conditions of a pusher nozzle pressure of 0.64 MPa and a gliding nozzle pressure of 0.60 MPa. A 50% particle diameter $D_{50}$ in volume-based cumulative particle size distribution of aggregates was 10 μm.

Figure 6:
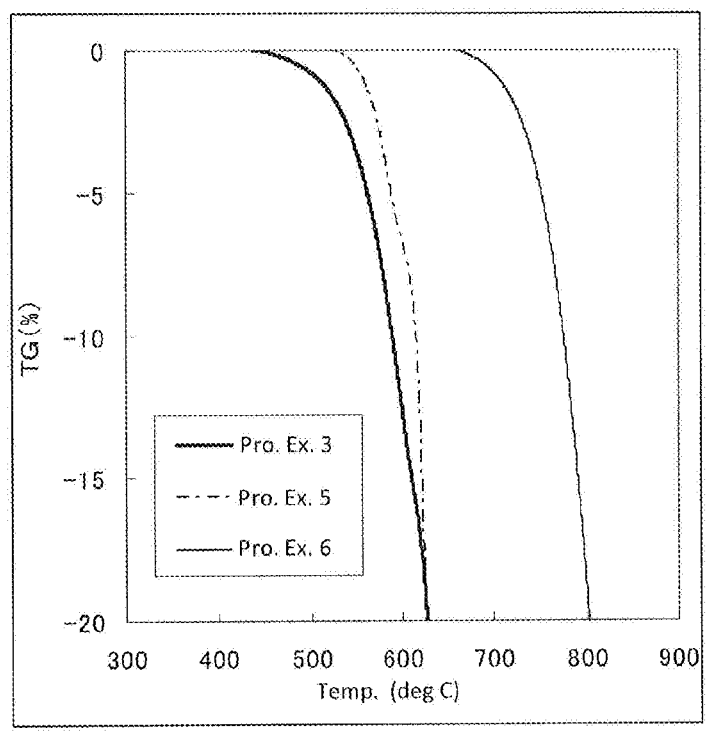
FIG. 6 a diagram showing thermal analysis results of multiwalled carbon nanotubes, calcined carbon nanofibers and graphitized carbon nanofibers.
Figure 10:
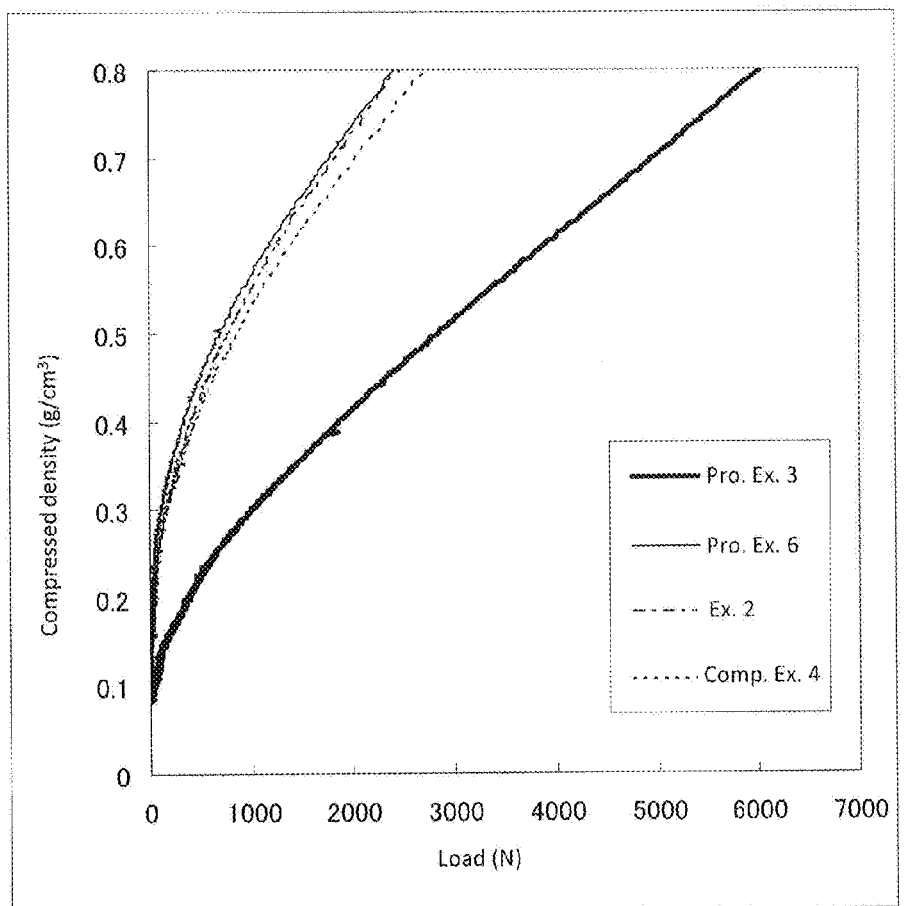
FIG. 10 a diagram showing a relation between the load and the compressed density when a powder is compressed.
Figure 11:
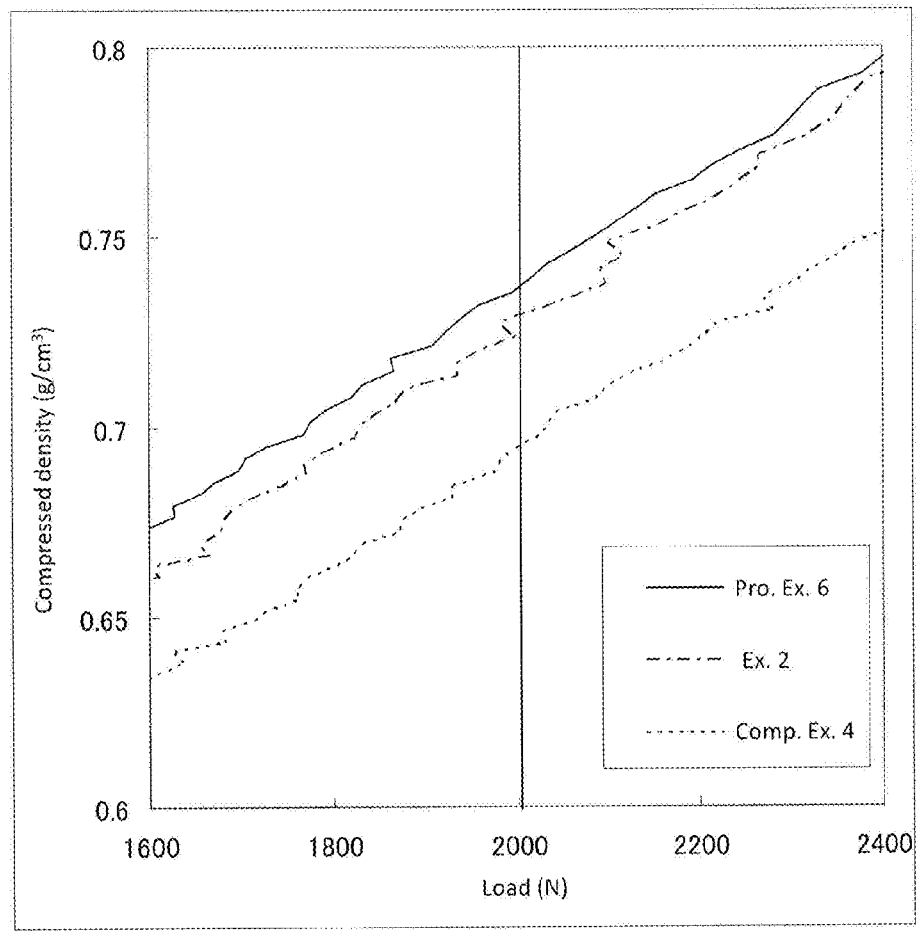
FIG. 11 a diagram showing enlargedly a compressed density under a load of 1,600 to 2,400 N in FIG. 10.

Fiber shape and powder properties are shown in Table 1, results of thermal analysis are shown in FIG. 6, and a relation between the load and the compressed density is shown in FIGS. 10 and 11.

Production Example 4

Synthesis of Carbon Nanofibers

A reactor composed of a reaction tube measuring 370 mm in inner diameter and 2,000 mm in length, and a heater was prepared. A two fluid mixing nozzle for supplying a raw material was disposed at the upper portion of the reaction tube and a conveyor was disposed at the lower portion of the reaction tube, and then they were connected to a tank provided with a bag filter. An inflammable gas passed through the bag filter was allowed to undergo combustion by an incinerator.

Ferrocene (0.49 kg) and sulfur (0.01 kg) were dissolved in benzene (13.5 kg) to prepare a raw material liquid (content of ferrocene: 3.5% by mass, the content of sulfur: 0.08% by mass in the raw material liquid).

The thus prepared raw material liquid was supplied at 360 g/minute and hydrogen was supplied at 700 NL/minute, and then the raw material liquid was sprayed into the reaction tube through two fluid nozzles and passed through a reaction furnace heated at 1,300° C. to synthesize carbon fibers. After supplying the raw material for 2 hours, supply of the raw material liquid and hydrogen was stopped, and then nitrogen was supplied to discharge an inflammable gas.

Production Example 5

Calcination of Carbon Nanofibers: Calcined CNF

A graphite crucible (measuring an outer diameter of 100 mm, an inner diameter of 85 mm and a length of 200 mm) was filled with 80 g of the carbon nanofibers obtained in Production Example 4 and then set in a calcination furnace (inner diameter: 120 mm). Tar adhered to the carbon nanofibers was removed by raising the temperature to 1,200° C. over 4 hours in an argon atmosphere, followed by maintaining for 1 hour. After calcination, the calcined carbon nanofibers recovered from the graphite crucible was pulverized by a juicer mixer (Fiber Mixer MX-X57 manufactured by Panasonic Corporation) for 1 minute.

Fiber shape and powder properties are shown in Table 1. The results of thermal analysis are shown in FIG. 6.

Production Example 6

Graphitization of Carbon Nanofibers: Graphitized CNF

A graphite crucible was filled with the calcined carbon nanofibers obtained in Production Example 5 and then set in a high-frequency heating furnace (inner diameter: 120 mm). The carbon nanofibers were graphitized by raising the temperature to 2,800° C. over 4 hours in argon atmosphere, followed by maintaining for 1 hour. After graphitization treatment, the graphitized carbon nanofibers recovered from the graphite crucible were pulverized at a rotational speed of 5,000 rpm using airflow pulverizer KV-3 Labo Unit manufactured by Yakushin Kikai Seisakusho.

Figure 4:
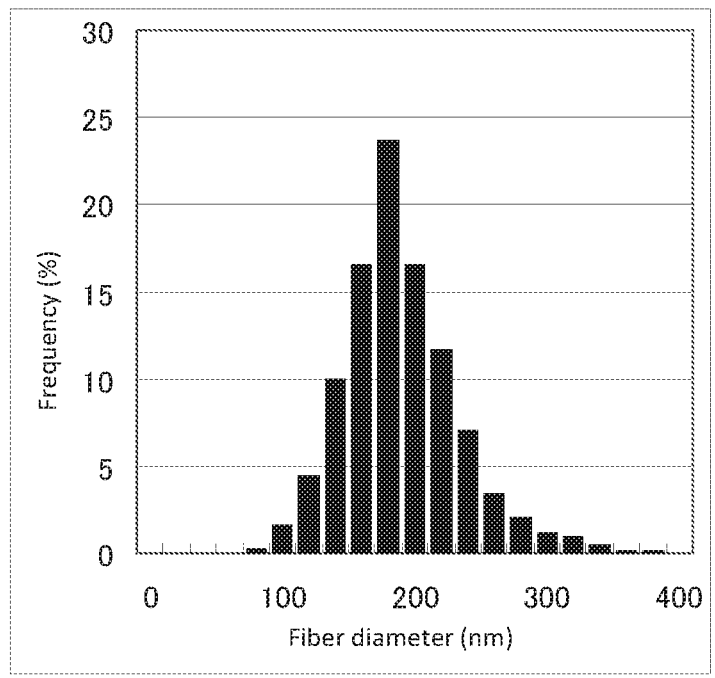
FIG. 4 a diagram showing fiber diameter distribution of graphitized carbon nanofibers.

Fiber shape and powder properties are shown in Table 1. A scanning electron micrograph is shown in FIG. 1, fiber diameter distribution is shown in FIG. 4, the results of thermal analysis are shown in FIG. 6, and a relation between the load and the compressed density is shown in FIGS. 10 and 11.

TABLE 1

| | 2 MWCNT | 3 Pulverized MWCNT product | 5 Calcined CNF | 6 Graphitized CNF |
|---|---|---|---|---|
| | | Production Example | | |
| Fiber Diameter (nm) | 10 | 10 | 180 | 180 |
| Fiber Length (μm) | 4.5 | 4.0 | 7.5 | 7.2 |
| Aspect ratio | 450 | 400 | 42 | 40 |
| Compressed specific resistance (Ωcm) | 0.0162 | 0.0178 | 0.0424 | 0.0151 |
| BET specific surface area (m²/g) | 260 | 260 | 14 | 13 |
| $C_0$ (nm) | 0.683 | 0.683 | 0.693 | 0.677 |
| Oxidation initiation temp. (deg C.) | 460 | 460 | 510 | 660 |
| Inpurities | | | | |
| Fe (ppm) | 12000 | 12000 | 14000 | 10 |
| Mo (ppm) | 2000 | 2000 | N.D. | N.D. |

Example 1

In a 2 L beaker, 1,470 g of pure water and a stirring bar were placed, and the beaker was placed on a magnetic stirrer. After weighing 29.4 g of the graphitized carbon nanofibers obtained in Production Example 6 and 0.6 g of the pulverized multiwalled carbon nanotubes product obtained in Production Example 3, they were put in pure water, followed by stirring for 5 minutes. Thereafter, the slurry was charged in a tank Nanovater manufactured by Yoshida Kikai Co., Ltd.
(High-Pressure Dispersion Treatment)

The slurry in the tank was transferred to a slurry pump by a pressure pump, and then pressed into a straight nozzle (nozzle diameter 190 μm) under 150 MPa by a slurry pump. The liquid subjected to high-pressure dispersion treatment was passed through a heat exchanger by the straight nozzle, and then recovered in a 2 L beaker. The slurry was passed through the straight nozzle once.

The liquid subjected to the high-pressure dispersion treatment was filtered through a filter paper (5 C) set in Nutsche under evacuation conditions by an aspirator. Filtration was completed at the time when a cake-shaped solid matter on the filter paper undergoes cracking and the pressure reaches around an atmospheric pressure (−150 mmHg) from an evacuation state (−750 mmHg).

The obtained cake-shaped solid matter was placed in a porcelain dish and then dried for 9 hours using a hot air dryer set at 150° C.

The dry aggregated composite carbon fibers were pulverized by a juicer mixer for 1 minute to obtain a composite carbon fibers. Presence or absence of carbon nanotube aggregates of 1 μm or more in size and powder properties are shown in Table 2.

Example 2

In a 2 L beaker, 1,470 g of pure water and a stirring bar were placed, and the beaker was placed on a magnetic stirrer. After weighing 27.0 g of the graphitized carbon nanofibers obtained in Production Example 6 and 3.0 g of the pulverized multiwalled carbon nanotubes product obtained in Production Example 3, they were put in pure water, followed by stirring for 5 minutes. Thereafter, the slurry was charged in a tank Nanovater manufactured by Yoshida Kikai Co., Ltd.

Figure 9:
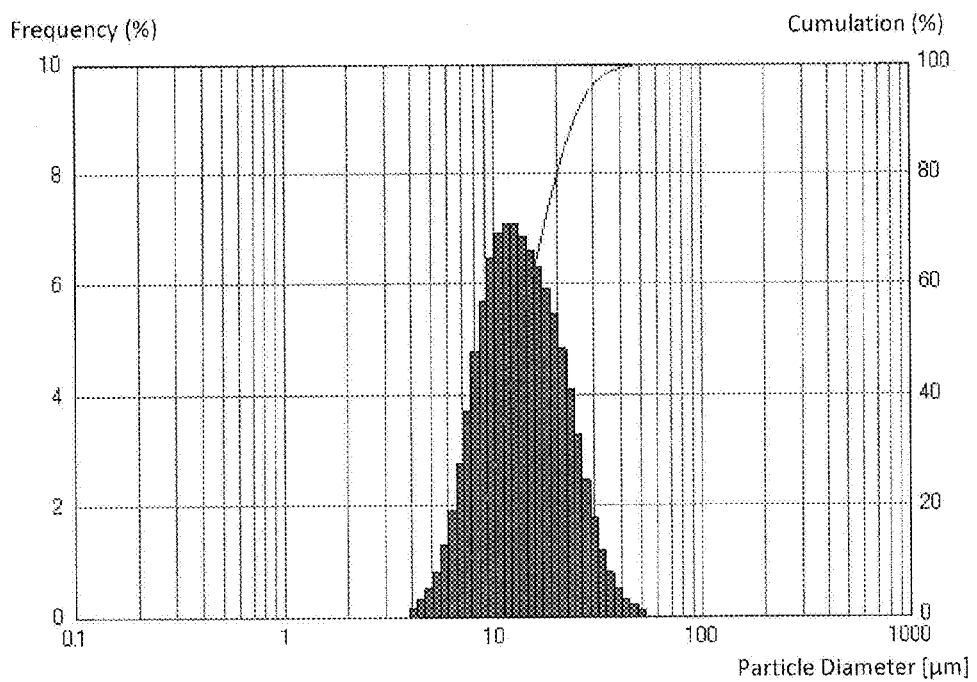
FIG. 9 a diagram showing particle size distribution of composite carbon fiber aggregates.

The slurry was subjected to high-pressure dispersion treatment, followed by solid-liquid separation and further drying in the same manner as in Example 1 to obtain composite carbon fibers. Presence or absence of carbon nanotube aggregates having an aggregate size of 1 μm or more and powder properties are shown in Table 2. A scanning electron micrograph of the obtained composite carbon fibers is shown in FIG. 7. Particle size distribution is shown in FIG. 9. A relation between the load and the compressed density is shown in FIGS. 10 and 11.

Example 3

In a 2 L beaker, 1,470 g of pure water and a stirring bar were placed, and the beaker was placed on a magnetic stirrer. After weighing 24.0 g of the graphitized carbon nanofibers obtained in Production Example 6 and 6.0 g of the pulverized multiwalled carbon nanotubes product obtained in Production Example 3, they were put in pure water, followed by stirring for 5 minutes. Thereafter, the slurry was charged in a tank Nanovater manufactured by Yoshida Kikai Co., Ltd.

The slurry was subjected to high-pressure dispersion treatment, followed by solid-liquid separation and further drying in the same manner as in Example 1 to obtain composite carbon fibers. Presence or absence of carbon nanotube aggregates having an aggregate size of 1 μm or more and powder properties are shown in Table 2.

Comparative Example 1

In a 2 L beaker, 1,470 g of pure water and a stirring bar were placed, and the beaker was placed on a magnetic stirrer. After weighing 27.0 g of the calcined carbon nanofibers obtained in Production Example 5 and 3.0 g of the pulverized multiwalled carbon nanotube product obtained in Production Example 3, they were put in pure water, followed by stirring for 5 minutes. Thereafter, the slurry was charged in a tank Nanovater manufactured by Yoshida Kikai Co., Ltd.

The slurry was subjected to high-pressure dispersion treatment, followed by solid-liquid separation and further drying in the same manner as in Example 1 to obtain composite carbon fibers. Presence or absence of a carbon nanotube aggregate having an aggregate size of 1 μm or more and powder properties are shown in Table 2.

Comparative Example 2

In a 2 L beaker, 1,470 g of pure water and a stirring bar were placed, and the beaker was placed on a magnetic stirrer. After weighing 24.0 g of the calcined carbon nanofibers obtained in Production Example 5 and 6.0 g of the pulverized multiwalled carbon nanotubes product obtained in Production Example 3, they were put in pure water, followed by stirring for 5 minutes. Thereafter, the slurry was charged in a tank Nanovater manufactured by Yoshida Kikai Co., Ltd.

The slurry was subjected to high-pressure dispersion treatment, followed by solid-liquid separation and further drying in the same manner as in Example 1 to obtain composite carbon fibers. Presence or absence of a carbon nanotube aggregate having an aggregate size of 1 μm or more and powder properties are shown in Table 2.

Comparative Example 3

After weighing 4.9 g of the graphitized carbon nanofibers obtained in Production Example 6 and 0.1 g of the pulverized multiwalled carbon nanotubes product obtained in Production Example 3, they were mixed by a juicer mixer for 1 minute to obtain mixed carbon fibers. Presence or absence of carbon nanotube aggregates having an aggregate size of 1 μm or more and powder properties are shown in Table 2.

Comparative Example 4

After weighing 4.5 g of the graphitized carbon nanofibers obtained in Production Example 6 and 0.5 g of the pulverized multiwalled carbon nanotubes product obtained in Production Example 3, they were mixed by a juicer mixer for 1 minute to obtain mixed carbon fibers. Presence or absence of carbon nanotube aggregates having an aggregate size of 1 μm or more and powder properties are shown in Table 2. A scanning electron micrograph of the obtained mixed carbon fibers is shown in FIG. 8. A relation between the load and the compressed density is shown in FIGS. 10 and 11. A multiwalled carbon nanotube disentangled in the space between graphitized carbon nanofibers did not exist, and an aggregate composed of multiwalled carbon nanotubes of 4 μm or more in size were interspersed.

then constant voltage charging was carried out at 3.6 V and charging was stopped at the time when the current value decreases to the value corresponding to 1/20 C.

Next, each constant current discharging was carried out at the current value corresponding to 0.2 C, 7.0 C and 10.0 C, followed by cutting-off at the voltage of 2.5 V.

A ratio of a discharge capacity at the current value corresponding to 7.0 C and a ratio of a discharge capacity at the current value corresponding to 10.0 C to a discharge capacity at the current value corresponding to 0.2 C were employed as a 7 C capacity ratio and a 10 C capacity ratio (discharge capacity retention ratio).

Example 4

The method for producing a cathode sample is shown below.

After weighing 200 g in total such that amass ratio of lithium iron phosphate (LFP(LiFePO$_4$):average particle diameter: 2 μm), the composite carbon fibers obtained in Example 1 and acetylene black becomes 94.7:2.1:3.2, dry mixing was performed using TK HIVIS MIX (Model 2P-03,

TABLE 2

|  | Example | | | Comp. Example | | | |
| --- | --- | --- | --- | --- | --- | --- | --- |
|  | 1 | 2 | 3 | 1 | 2 | 3 | 4 |
| CNF | | | | | | | |
| Graphitized CNF | 98 | 90 | 80 | — | — | 98 | 90 |
| Calcined CNF | — | — | — | 90 | 80 | — | — |
| MWCNT | | | | | | | |
| Pulverized MWCNT product | 2 | 10 | 20 | 10 | 10 | 2 | 10 |
| Mixing method | High Pressure Dispersion | High Pressure Dispersion | High Pressure Dispersion | High Pressure Dispersion | High Pressure Dispersion | Mixing with Mixer | Mixing with Mixer |
| Dispersion state | Good | Good | Good | Good | Good | Poor | Poor |
| Aggregate of 1 μm or more in size | Not Observed | Not Observed | Not Observed | Not Observed | Not Observed | Observed | Observed |
| $\rho$(g/cm$^3$)@2000N | 0.729 | 0.724 | 0.702 | 0.448 | 0.449 | 0.711 | 0.694 |
| $\rho/\rho_0$@2000N | 0.99 | 0.98 | 0.95 | 1.05 | 1.05 | 0.97 | 0.94 |
| Compressed specific resistance (Ωcm) | 0.0146 | 0.0123 | 0.0120 | 0.0359 | 0.0311 | 0.0136 | 0.0124 |
| 50% Particle diameter (μm) | 9 | 13 | 16 | 14 | 18 | 8 | 9 |

A battery was evaluated by the following procedure.
(Production of Li Ion Battery Test Cell (Laminate Cell))

A laminate cell was produced in the following manner. The following operation was carried out in dry argon atmosphere at a dew point of −80° C. or lower.

A cathode and an anode were disposed opposite to each other, comprising a separator (microporous film made of polypropylene (Celgard 2400 manufactured by Celgard Inc.), 25 μm) therebetween to produce a laminate. The obtained laminate was wrapped with an aluminum laminate, and then three sides were sealed. Thereafter, an electrolytic solution was injected into the sealed laminate, followed by vacuum sealing to obtain a cell for test.
(Electrolytic Solution)

A solvent is mixture of 2 parts by volume of EC (ethylene carbonate) with 3 parts by volume of EMC (ethyl methyl carbonate) and an electrolyte is 1.0 mol/liter of LiPF$_6$. An electrolytic solution also contains 1% by mass of VC (vinylene carbonate) as an additive.
(Large Current Loading Test (Laminate Cell))

First, constant current charging was carried out at the current corresponding to 0.2 C from a rest potential to 3.6 V, and manufactured by PRIMIX Corporation). To the obtained mixture, an N-methyl-2-pyrrolidone solution of polyvinylidene fluoride (KF-polymer (L#1320) manufactured by KUREHA CHEMICAL INDUSTRY CO., LTD.) was added such that the solid content of polyvinylidene fluoride becomes 5% by mass, and then the mixture was kneaded. While adding N-methyl-2-pyrrolidone, the kneaded mixture was further kneaded to obtain slurry having an optimum coating viscosity.

The slurry was applied on an aluminum foil using an automatic coating machine and dried at 100° C., followed by drying using a vacuum dryer (100° C.). Thereafter, the coated aluminum foil was punched into a predetermined size and pressed using a uniaxial press (at an electrode density of 2.0 g/cm$^3$).

Subsequently, the method for producing an anode sample is shown.

After weighing 200 g in total such that a mass ratio of an anode active material (SCMG (registered trademark): manufactured by Showa Denko K.K., average particle diameter: 6 μm), acetylene black and fibrous carbon (VGCF-H: manufactured by Showa Denko K.K.) becomes 97.3:2.2:0.5, dry mixing was performed using TK HIVIS MIX. To the obtained mixture, an N-methyl-2-pyrrolidone solution of polyvinylidene fluoride (KF-polymer (L#9130) manufactured by KUREHA CHEMICAL INDUSTRY CO., LTD.) was added such that the solid content of polyvinylidene fluoride becomes 5% by mass, and then the mixture was kneaded. While adding N-methyl-2-pyrrolidone, the kneaded mixture was further kneaded to obtain slurry having an optimum coating viscosity.

The slurry was applied on a copper foil using an automatic coating machine and dried at 90° C., followed by drying using a vacuum dryer (90° C.). Thereafter, the coated copper foil was punched into a predetermined size and pressed using a uniaxial press (at an electrode density of 1.3 g/cm$^3$).

The evaluation results of the battery are shown in Table 3.

Example 5

Figure 12:
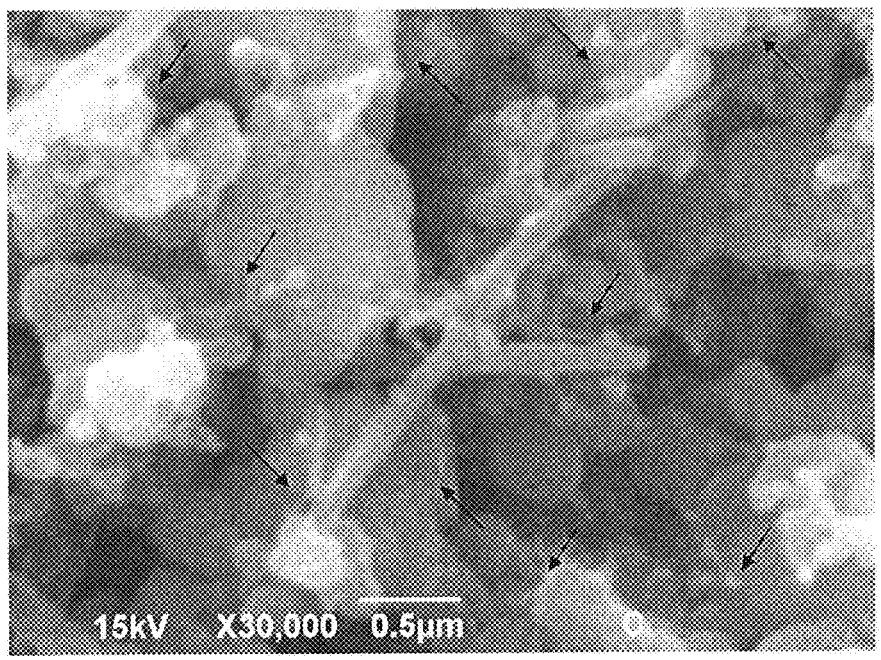
FIG. 12 a diagram showing an example of a scanning electron micrograph of composite carbon fibers added in electrode (30 k times: arrow (thin) indicates a multiwalled carbon nanotube in the diagram).

In the same manner as in Example 4, except that the composite carbon fibers obtained in Example 1 was changed to the composite carbon fibers obtained in Example 2, a cathode sample was produced and a battery was evaluated. The evaluation results of the battery are shown in Table 3. A scanning electron micrograph of an electrode is shown in FIG. 12. It is apparent that a cathode, carbon black, multiwalled carbon nanotubes and graphitized carbon nanofibers are uniformly dispersed in an electrode.

Example 6

In the same manner as in Example 4, except that the composite carbon fibers obtained in Example 1 was changed to the composite carbon fibers obtained in Example 3, a cathode sample was produced and a battery was evaluated. The evaluation results of the battery are shown in Table 3.

Comparative Example 5

In the same manner as in Example 4, except that the composite carbon fibers obtained in Example 1 was changed to the composite carbon fibers obtained in Comparative Example 1, a cathode sample was produced and a battery was evaluated. The evaluation results of the battery are shown in Table 3.

Comparative Example 6

In the same manner as in Example 4, except that the composite carbon fibers obtained in Example 1 was changed to the composite carbon fibers obtained in Comparative Example 2, a cathode sample was produced and a battery was evaluated. The evaluation results of the battery are shown in Table 3.

Comparative Example 7

In the same manner as in Example 4, except that the composite carbon fibers obtained in Example 1 was changed to the mixed carbon fibers obtained in Comparative Example 3, a cathode sample was produced and a battery was evaluated. The evaluation results of the battery are shown in Table 3.

Comparative Example 8

Figure 13:
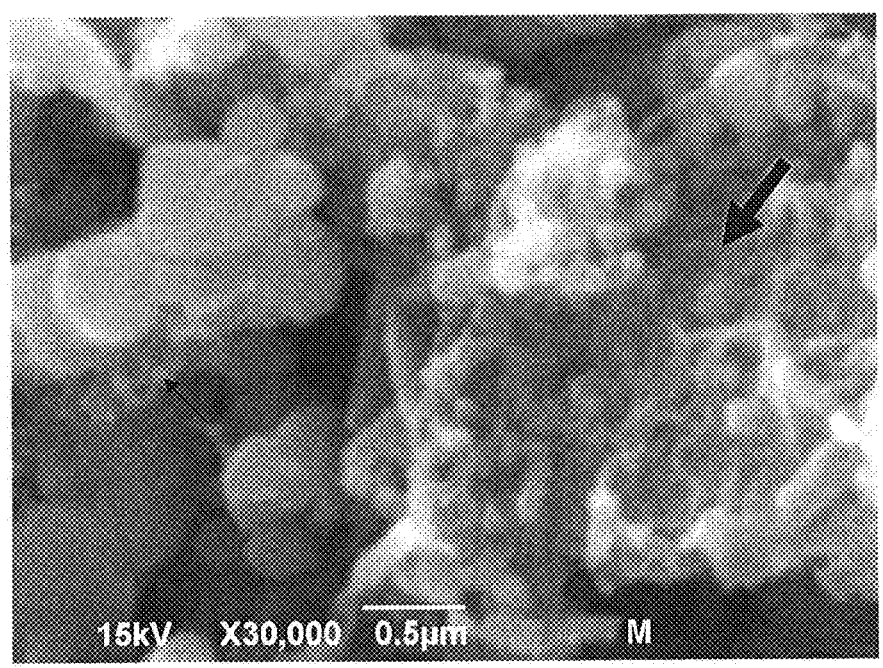
FIG. 13 a diagram showing an example of a scanning electron micrograph of mixed carbon fibers added in electrode (30 k times: arrow (thin) indicates a multiwalled carbon nanotube, while arrow (thick) indicates a multiwalled carbon nanotube aggregate in the diagram).

In the same manner as in Example 4, except that the composite carbon fibers obtained in Example 1 was changed to the mixed carbon fibers obtained in Comparative Example 4, a cathode sample was produced and a battery was evaluated. The evaluation results of the battery are shown in Table 3. A scanning electron micrograph of an electrode is shown in FIG. 13. It is apparent that a multiwalled carbon nanotube aggregate is unevenly distributed in an electrode.

Comparative Example 9

In the same manner as in Example 4, except that the composite carbon fibers obtained in Example 1 was changed to the graphitized carbon nanofibers obtained in Production Example 6, a cathode sample was produced and a battery was evaluated. The evaluation results of the battery are shown in Table 3.

Comparative Example 10

In the same manner as in Example 4, except that the composite carbon fibers obtained in Example 1 was changed to the multiwalled carbon nanotubes obtained in Production Example 3, a cathode sample was produced and a battery was evaluated. The evaluation results of the battery are shown in Table 3.

TABLE 3

| | capacity retention ratio (%) to 0.2 C capacity | |
|---|---|---|
| | 7 C | 10 C |
| Ex. 4 | 55 | 30 |
| Ex. 5 | 60 | 40 |
| Ex. 6 | 65 | 50 |
| Comp. Ex. 5 | 5 | 1 |
| Comp. Ex. 6 | 8 | 1 |
| Comp. Ex. 7 | 30 | 5 |
| Comp. Ex. 8 | 50 | 15 |
| Comp. Ex. 9 | 22 | 2 |
| Comp. Ex. 10 | 30 | 5 |

EXPLANATION OF SYMBOLS

1: terminal for measurement of voltage
2: compression rod
3: current terminal made of copper plate
4: cell made of resin
5: object to be measured

The invention claimed is:

1. Aggregates comprising composite carbon fibers, in which the composite carbon fibers comprise multiwalled carbon nanotubes having a fiber diameter of from 5 nm to 30 nm and an aspect ratio of from 100 to 1000 and graphitized carbon nanofibers having a fiber diameter of from 50 nm to 300 nm,
   wherein the multiwalled carbon nanotubes are homogeneously dispersed between the graphitized carbon nanofibers and near the surface of the graphitized carbon nanofibers, and the dispersion state is a state where carbon nanofibers extend through the space between carbon nanotubes disentangled in a loose state.

2. The aggregates according to claim 1, wherein a compressed specific resistance at a compressed density of 0.8 g/cm$^3$ measured using the composite carbon fibers is lower than a compressed specific resistance at a compressed density of 0.8 g/cm$^3$ measured using the multiwalled carbon nanotube alone, and is also lower than a compressed specific resistance at a compressed density of 0.8 g/cm$^3$ measured using the graphitized carbon nanofiber alone.

3. The aggregates according to claim 1, wherein the multiwalled carbon nanotubes have $C_0$ value of from 0.680 nm to 0.690 nm, and the graphitized carbon nanofibers have $C_0$ value of from 0.676 nm to 0.680 nm.

4. The aggregates according to claim 1, wherein the multiwalled carbon nanotubes have an oxidation initiation temperature of from 400° C. to 550° C. or lower, and the graphitized carbon nanofibers have an oxidation initiation temperature of from 600° C. to 700° C.

5. The aggregates according to claim 1, wherein the amount of the multiwalled carbon nanotubes is from 1% by mass to 50% by mass in the composite carbon fibers.

6. The aggregates according to claim 1, in which the composite carbon fibers do not substantially contain multiwalled carbon nanotube aggregates having an aggregate size of 1 μm or more.

7. The aggregates according to claim 1, wherein a ratio ($p/p_0$) of a density p of the composite carbon fibers when compressed under a load of 1,000 N or more to a density $p_0$ of graphitized carbon nanofibers when compressed under the same load is 0.95 or more.

8. The aggregates according to claim 1, wherein 50% particle diameter ($D_{50}$) in volume-based cumulative particle size distribution by laser diffraction particle size analysis is from 5 μm to 20 μm.

9. The aggregates according to claim 1, wherein a weight ratio of the graphitized carbon nanofibers to the multiwalled carbon nanotubes is from 80/20 to 98/2.

10. An electrode for a battery, comprising the aggregates according to claim 1.

11. A method for producing aggregates, the method comprising:
mixing multiwalled carbon nanotubes and graphitized carbon nanofibers in water to obtain a slurry, the carbon nanotubes having a fiber diameter of from 5 nm to 30 nm and an aspect ratio of from 100 to 1000, and the graphitized carbon nanofibers having a fiber diameter of from 50 to 300 nm;
passing the slurry through a pulverizing nozzle equipped in a high pressure dispersion device;
drying the slurry passing from the pulverizing nozzle; and
pulverizing the dried product,
wherein, in the pulverized dried product, the multiwalled carbon nanotubes are homogeneously dispersed between the graphitized carbon nanofibers and near the surface of the graphitized carbon nanofibers, and the dispersion state is a state where carbon nanofibers extend through the space between carbon nanotubes disentangled in a loose state.

* * * * *